United States Patent
Tetsumoto et al.

(10) Patent No.: US 8,419,824 B2
(45) Date of Patent: Apr. 16, 2013

(54) METHOD FOR PRODUCING BRIQUETTE, METHOD FOR PRODUCING REDUCED METAL, AND METHOD FOR SEPARATING ZINC OR LEAD

(75) Inventors: Masahiko Tetsumoto, Kobe (JP); Yutaka Miyakawa, Kobe (JP); Noriaki Mizutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 121 days.

(21) Appl. No.: 13/001,728

(22) PCT Filed: Jul. 8, 2009

(86) PCT No.: PCT/JP2009/062441
§ 371 (c)(1),
(2), (4) Date: Dec. 28, 2010

(87) PCT Pub. No.: WO2010/005023
PCT Pub. Date: Jan. 14, 2010

(65) Prior Publication Data
US 2011/0107874 A1 May 12, 2011

(30) Foreign Application Priority Data

Jul. 11, 2008 (JP) ................................ 2008-181919
Aug. 26, 2008 (JP) ................................ 2008-217126

(51) Int. Cl.
*C22B 1/24* (2006.01)
(52) U.S. Cl.
USPC ................................ 75/414; 75/658; 75/695
(58) Field of Classification Search .................... 75/770, 75/414, 658, 695
See application file for complete search history.

(56) References Cited

U.S. PATENT DOCUMENTS

| 4,117,073 A | 9/1978 | Koch et al. |
| 4,940,487 A | 7/1990 | Lugscheider et al. |
| 4,957,551 A * | 9/1990 | Aune et al. ............... 75/657 |
| 5,186,741 A * | 2/1993 | Kotraba et al. ............. 75/484 |
| 7,815,710 B2 | 10/2010 | Ibaraki et al. |
| 2009/0165599 A1 | 7/2009 | Goto et al. |

FOREIGN PATENT DOCUMENTS

| CN | 1036798 A | 11/1989 |
| JP | 2 15130 | 1/1990 |
| JP | 11 279611 | 10/1999 |
| JP | 2005 89842 | 4/2005 |

(Continued)

OTHER PUBLICATIONS

Bentor, Yinon. "Periodic Table: Melting Point" from Chemical Elements.com. Downloaded from http://www.chemicalelements.com/show/meltingpoint.html on Jun. 8, 2012.*

(Continued)

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

An object of the present invention is to produce briquettes that have high strength even when the amounts of binder and water used are decreased as much as possible. A method for producing briquettes that achieve this object includes a step of forming primary granules by using a powder containing a metal oxide and at least one of zinc oxide, lead oxide, and titanium oxide and a step of compressing the primary granules still containing the at least one of zinc oxide, lead oxide, and titanium oxide so as to mold the primary granules into secondary granules.

32 Claims, 4 Drawing Sheets

FOREIGN PATENT DOCUMENTS

| | | |
|---|---|---|
| KR | 10-0234844 | 12/1999 |
| RU | 2 303 071 C2 | 7/2007 |
| SU | 404873 | 6/1974 |

OTHER PUBLICATIONS

Machine Translation of JP 2005-089842, published Apr. 7, 2005.*
Office Action issued Feb. 3, 2012, in Australian Patent Application No. 2009270230.
Russian Office Action issued Mar. 23, 2012, in Patent Application No. 2011105027 (with English-language translation).
International Search Report issued Oct. 13, 2009 in PCT/JP09/62441 filed Jul. 8, 2009.
Office Action issued Jul. 4, 2012 in Chinese Application No. 200980126815.1 (With English Translation).
Office Action Dispatch Date Sep. 7, 2012, in Korean Application No. 2011-7000595 with English translation.

* cited by examiner (a)

(b)

METHOD FOR PRODUCING BRIQUETTE, METHOD FOR PRODUCING REDUCED METAL, AND METHOD FOR SEPARATING ZINC OR LEAD

TECHNICAL FIELD

The present invention relates to a method for producing agglomerates (briquettes) by using iron ore or dust raw materials containing iron oxides and can be applied to a method for producing a reduced metal (reduced iron) from the resulting agglomerates and a method for separating and recovering volatile metals such as zinc, lead, and the like.

BACKGROUND ART

While iron ore raw materials are used as the raw material for producing reduced iron as might be expected, recent price surge of iron ore raw materials due to strong demand has brought attention to recycling of iron raw material-containing dust produced in iron mills. In pig iron- and steel-making processes, powdery iron and iron oxide-containing dust blown up in blast furnaces, converters, melting furnaces, electric furnaces, and the like are recovered with dust collectors. The recovered powders (referred to as "steel-making dust" in Claims and the specification) are used as iron raw materials since they contain iron and iron oxides.

In a rotary hearth furnace, which is one of facilities for producing reduced iron, raw materials containing metal oxides and carbonaceous substances must be fed in the form of agglomerates to achieve homogeneous reduction reactions, and the agglomerates need to have a particular strength. However, when carbonaceous substances are incorporated, since carbon burns at a relatively low temperature, a technique of increasing the strength of the agglomerates by sintering, such as in the cases of sintered pellets and sintered ore, cannot be employed. Thus, the strength of the agglomerates has been enhanced by use of expensive binding agents (hereinafter also referred to as "binders"), such as starch and molasses.

Typically, either one of a pellet-making facility or a briquette-making facility is used as the facility to produce agglomerates, and, in either cases, agglomerates having high strength and as uniform size as possible must be produced. However, it has been extremely difficult to produce agglomerates from fine raw materials mainly for two reasons described below. The first reason is that the fine powder dust raw materials have a small bulk density and many gaps and thus do not readily form high-strength agglomerates. If the strength of the agglomerates is low, the agglomerates may collapse under pressure and thus cannot be stored in large quantities, and cracking and the like may occur during transportation. The second reason is the difficulty of homogeneously mixing a binder, which is mixed into the fine raw materials to increase the strength of the agglomerates. This is because a binder having an adhesive function has viscosity, and this viscosity obstructs homogeneous mixing. In addition, the binder materials are not only expensive but also can cause clogging of materials during manufacture or feeding (e.g., in an intermediate hopper or the like) of the agglomerates since the binder materials have the adhesive function. Once clogging of the raw materials occurs, the supply of raw materials to the rotary hearth furnace or the like stops or a large quantity of raw materials are suddenly fed, which renders the operation of the reducing furnace unstable. Thus, the amount of the binder used is preferably as small as possible.

In the description below, methods for producing pellets and briquettes of fine dust raw materials that have been known in the art are explained by citing examples.

Patent Document 1 teaches a method for producing pellets including kneading raw materials, which has been discharged from a raw material storage, by using a kneader and pelletizing the raw material, which includes grains containing a metal oxide and carbon, by using a pan pelletizer, as shown in FIG. 1 of Patent Document 1. In particular, a plurality of raw materials are fed onto a raw material conveyer from a plurality of material reservoir bins at a determined mixture ratio. The grain diameter of the raw material, the chemical composition, and the ratio of water to be mixed are determined. In particular, in order to adequately carry out reduction reactions, the ratio of the metal oxide to carbon is adjusted. The claims of Patent Document 1 disclose a method for producing pellets suitable for reducing furnaces, the method being characterized in that, in producing spherical pellets with a pan pelletizer from a powder containing a metal oxide containing steel-making dust and a carbon-containing powder, the powder contains 20 to 80% of grains having a diameter of 10 µm or less.

Patent Document 2 teaches a method for producing a solidified product from steel-making dust as shown in FIG. 1 of this patent document. As shown in this drawing, this system includes a granulating step of mixing the dust mainly composed of iron and its oxides produced during steel making with a powder mainly composed of carbon and pelletizing the resulting mixture, a water impregnation step of impregnating the mixture granules with water, a solidifying step of placing the water-impregnated pellets into forming dies and pressure-compacting the pellets to form briquettes, a transfer step of transferring the briquettes as the raw material for a melting furnace, and a dezincing step of concentrating zinc in the dust and dezincing the dust in the concentrated state after obtaining the dust from the melting furnace and before the solidifying step. According to this method, since impregnation with water is conducted immediately before molding, the surfaces of the mixture granules are softened to promote deformation of granules during briquetting, and the adhesion strength between the granules can be increased as a result.

PRIOR ART DOCUMENT

Patent Documents

[Patent Document 1] Japanese Unexamined Patent Application Publication No. 2002-206120
[Patent Document 2] Japanese Unexamined Patent Application Publication No. 2007-270229

SUMMARY

Problems to be Solved by the Invention

In general, since homogeneous reduction reactions need to be conducted in reducing furnaces for reducing iron oxides, the agglomerates to be fed to the reducing furnaces must be uniform in size. If the agglomerates vary in size, homogeneous reducing reactions do not occur and the quality of the reduced iron is significantly degraded. In FIG. 1 of Patent Document 1, a pellet sieve is used to classify the pellets so as to maintain uniformity required in the reducing furnaces. However, not only the efficiency of feeding the pellets is degraded due to the pellet sieve but also the cost of the pellet sieve itself poses a problem.

The method described in Patent Document 2 is used to mold briquettes. Compared to pellets, briquettes have higher uniformity and can form large agglomerates. However, since briquettes are formed by press-compacting the raw materials, they usually require binders as described above. The method disclosed in Patent Document 2 involves impregnating the raw material with water immediately before molding the briquettes so as to minimize the amount of the binder used; however, in practice, it is difficult to homogeneously impregnate all parts of pellet aggregates with water. If one portion remains untouched with water, the surface of that portion of the mixture granule cannot be softened, and thus, the strength of the briquette as a whole does not increase. Moreover, it takes a longer time to dry the water after briquetting.

In Patent Document 2, the pellets are gathered and briquetted to enhance ease of handling achieved by a relatively large size compared to the case of making small coal pea-like granules (refer to paragraph [0007]), but not to increase the strength of the briquettes to be higher than the strength of the pellets.

An object of the present invention is to produce briquettes that have high strength even when the amounts of binder and/or water used are decreased as much as possible.

Means for Solving the Problem

A method for producing briquettes of the present invention that achieves the above-described object includes a step of forming primary granules by using a powder of a metal oxide containing an iron oxide and at least one of zinc oxide, lead oxide, and titanium oxide and a step of compressing the primary granules still containing the at least one of zinc oxide, lead oxide, and titanium oxide so as to mold the primary granules into secondary granules.

In the method for producing briquettes described above, the primary granules are preferably formed by tumbling granulation, kneading granulation, or pressure compaction.

In the method for producing briquettes described above, the total content of the at least one of zinc oxide, lead oxide, and titanium oxide is preferably 10 percent by mass or more.

The method for producing briquettes described above preferably further includes a step of crushing the metal oxide and/or a reductant before the step of forming the primary granules, and the powder preferably contains a product obtained by the crushing step.

The method for producing briquettes described above preferably further includes a step of preparing a mixed raw material by mixing the metal oxide and the reductant, the preparation step being performed between the crushing step and the step of forming the primary granules.

In the method for producing briquettes described above, the metal oxide preferably contains steel-making dust.

In the method for producing briquettes described above, the metal oxide preferably contains at least one metal selected from zinc, lead, sodium, and potassium, and the secondary granules are preferably molded while the metal is still contained.

In the method for producing briquettes described above, the metal oxide preferably contains a total of 10 percent by mass or more of at least one selected from oxides, chlorides, or sulfides of at least one metal selected from zinc, lead, sodium, and potassium.

In the method for producing briquettes described above, the metal oxide preferably contains an oxide of a metal having a melting point of 2000° C. or less (referred to as "volatile metal" hereinafter) and molding of the secondary granules is preferably performed with the oxide of the volatile metal still contained.

In the method for producing briquettes described above, a reductant and water are preferably added to the primary granules.

In the method for producing briquettes described above, the primary granules are preferably dried prior to being molded into the secondary granules.

Preferably, the water content in the primary granules is reduced to 50 to 95 percent by mass by the drying step relative to the water content before drying.

The method for producing briquettes described above preferably further includes a step of drying the secondary granules.

In the method for producing briquettes described above, the volume of the primary granules is preferably 1/500 or more of the inner volume of a form for molding the secondary granules.

A reduced metal can be produced by reducing the briquettes obtained by the above-described method for producing the briquettes.

In the method for producing a reduced metal described above, the reducing step is preferably conducted by using a rotary hearth furnace, a kiln furnace, or an electric heat reducing melting furnace.

Zinc can be separated by adding a step of evaporating zinc by heating and reducing briquettes containing zinc oxide obtained by the method for producing briquettes described above.

Lead can be separated by adding a step of evaporating lead by heating or heating and reducing briquettes containing lead oxide obtained by the method for producing briquettes described above.

Note that both heating and reducing are needed in the method for separating zinc described above because zinc oxide has a low saturation vapor pressure and rarely evaporates by mere heating, thereby necessitating reduction.

A method for producing briquettes of the present invention that can achieve the above-described object includes a step of crushing a reductant and/or a metal oxide containing an iron oxide raw material, a step of forming primary granules using the metal oxide and the reductant, and a step of compressing the primary granules to mold the primary granules into secondary granules.

In the method for producing briquettes described above, the primary granules are preferably formed by tumbling granulation, kneading granulation, or pressure compaction.

The method for producing briquettes described above preferably further includes a step of preparing a mixed raw material by mixing the metal oxide and the reductant, the preparation step being performed between the crushing step and the step of forming the primary granules.

In the method for producing briquettes described above, the metal oxide preferably contains steel-making dust.

In the method for producing briquettes described above, the metal oxide preferably contains at least one metal selected from zinc, lead, sodium, and potassium, and the secondary granules are preferably molded while the metal is still contained.

In the method for producing briquettes described above, the metal oxide preferably contains a total of 10 percent by mass or more of at least one selected from oxides, chlorides, or sulfides of at least one metal selected from zinc, lead, sodium, and potassium.

In the method for producing briquettes described above, the metal oxide preferably contains an oxide of a metal having a melting point of 2000° C. or less (referred to as "volatile metal" hereinafter) and molding of the secondary granules is preferably performed with the oxide of the volatile metal still contained.

In the method for producing briquettes described above, water is preferably added to the primary granules.

In the method for producing briquettes described above, the primary granules are preferably dried prior to being molded into the secondary granules.

The water content in the primary granules is preferably reduced to 50 to 95 percent by mass (hereinafter also simply referred to as "%") by the drying step relative to the water content before drying.

The method for producing briquettes described above preferably further includes a step of drying the secondary granules.

In the method for producing briquettes described above, the volume of the primary granules is preferably 1/500 or more of the inner volume of a form for molding the secondary granules.

A reduced iron can be produced by reducing the briquettes obtained by the above-described method for producing the briquettes.

In the method for producing a reduced iron described above, the reducing step is preferably conducted by using a rotary hearth furnace, a kiln furnace, or an electric heat reducing melting furnace.

Zinc can be separated by adding a step of evaporating zinc by heating and reducing briquettes containing zinc oxide obtained by the method for producing briquettes described above.

In the method for separating zinc described above, the step of heating and reducing is preferably performed by using a rotary hearth furnace, a kiln furnace, or an electric heat reducing melting furnace.

Lead can be separated by adding a step of evaporating lead by heating or heating and reducing briquettes containing lead oxide obtained by the method for producing briquettes described above.

In the method for separating lead described above, the step of heating or heating and reducing is preferably performed by using a rotary hearth furnace, a kiln furnace, or an electric heat reducing melting furnace.

Advantages

In the present invention, a metal oxide contains at least one of zinc oxide, lead oxide, and titanium oxide and the at least one zinc oxide, lead oxide, and titanium oxide serves as a binding agent for a raw material containing a metal oxide. Thus, a binder such as molasses or water does not have to be used prior to briquetting, and high-strength briquettes can be efficiently produced without particularly complicating the facility.

When a raw material prepared by crushing a metal oxide such as iron ore or steel-making dust and/or a reductant is used and granulation is conducted in two steps, the binding force between grains increases due to the intermolecular force working between the grains. A binder such as molasses or water is not necessary before briquetting, high-strength briquettes can be efficiently produced without particularly complicating the facility, and continuous production of briquettes is made possible, as described below.

BEST MODES FOR CARRYING OUT THE INVENTION

The inventors of the present inventions have found that when materials used as pigments of paints or the like, such as zinc oxide, lead oxide, and titanium oxide, are added to a metal oxide powder, these materials function as binding agents for the metal oxide and the strength of the molded briquettes can be improved without adding a binder or water. When the zinc oxide content or the like is adequately adjusted, the strength of the briquettes can be sufficiently improved without drying the briquettes after molding.

Usually, a pan pelletizer or a drum pelletizer is used as the granulator for making pellets. With any granulator, the resulting pellets have a relatively large particle size distribution due to the granulation principle. When pellets are formed by a pan pelletizer as described in Patent Document 1, a device for classifying the resulting pellets into a plurality of predetermined diameter ranges is usually necessary. However, the inventors have conducted extensive studies and found that when briquettes are formed by compressing the pellets after formation of the pellets, the variation in the pellet diameter rather contributes to increasing the briquette density since small pellets enter the gaps between large pellets. Thus, the present invention has been made.

The inventors have conducted investigations in various angles, e.g., the selection and amounts of iron ore, steel-making dust, reductants, binders such as molasses, etc., the amount of water, the timing of blending water, the degree of drying the agglomerates, and the like to improve the strength of the agglomerates that contain metal oxides (iron oxides) such as iron ore and steel-making dust as the raw materials. As a result, the following has been found. When an iron oxide raw material or a coarse reductant (preferably both) is crushed in a crusher such as a ball mill or a roll crusher, the mass of one grain decreases as the grain becomes finer and thus the grains are more apt to adhere and aggregate with each other. The strength of the final product agglomerates can thereby be significantly improved by performing a two-step granulation process of forming primary granules and secondary granules. Thus, the present invention has been made. Since a carbonaceous substance can be used as a representative example of a reductant, the description of a "carbonaceous substance" may be provided instead of the description of a "reductant" in this specification.

First Embodiment

A method for producing briquettes of the present invention includes (1) a step of forming primary granules by using a powder containing a metal oxide and at least one of zinc oxide, lead oxide, and titanium oxide and (2) a step of compressing the primary granules still containing at least one of zinc oxide, lead oxide, and titanium oxide so as to mold the primary granules into secondary granules.

Figure 1:
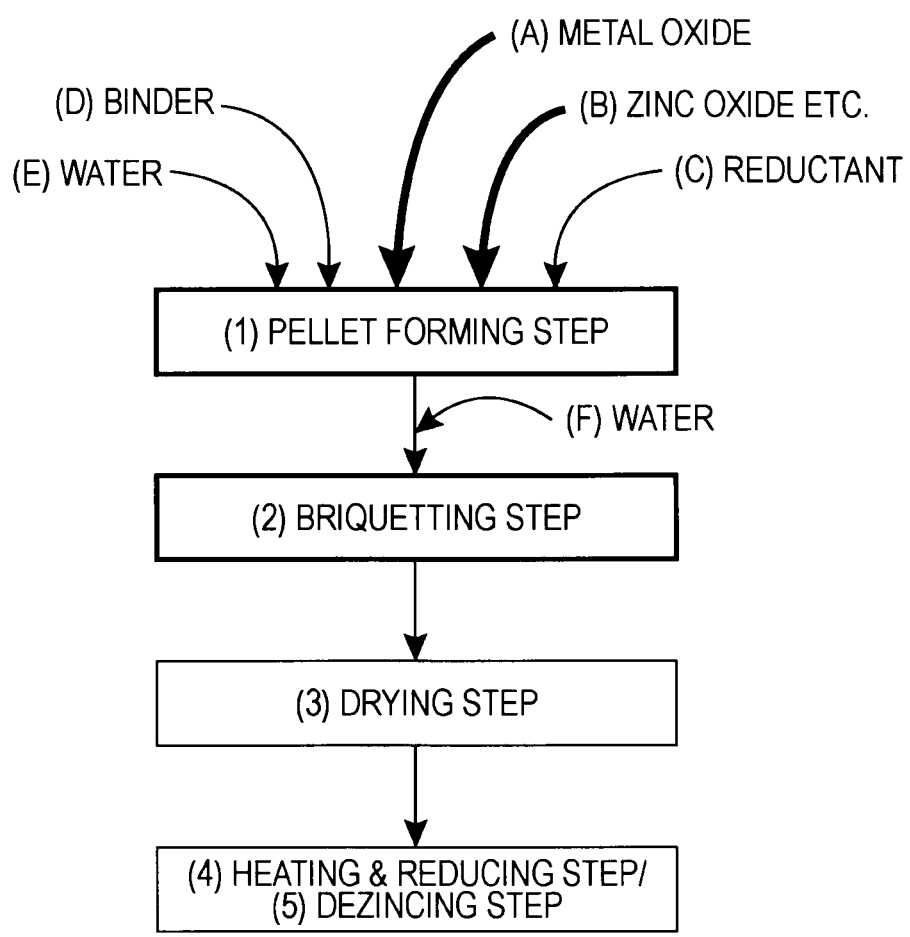
FIG. 1 is a process diagram related to a first embodiment of the present invention.
Figure 2:
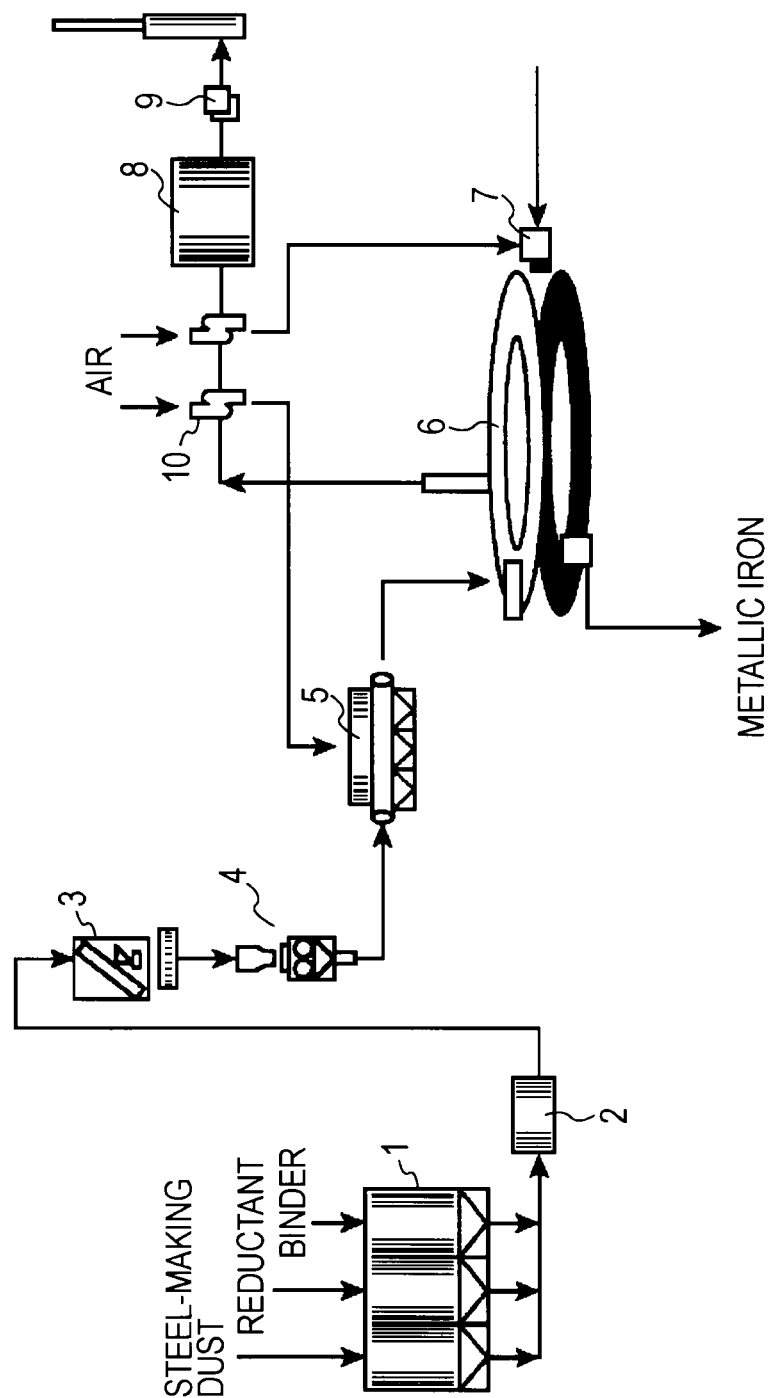
FIG. 2 is a drawing showing an example of facilities for implementing the process.

Examples of the method for forming the primary granules include tumbling granulation, kneading granulation, and pressure compaction. Here, the primary granules formed by tumbling granulation may be referred to as "pellets" and the secondary granules formed by pressure compaction may be referred to as "briquettes". An embodiment of the present invention will now be described by focusing on (1) pellet forming step and (2) briquetting step. FIG. 1 is a process diagram related to a first embodiment of the present invention. FIG. 2 is a diagram showing one example of facilities for implementing the process.

1. Process

As shown in FIG. 1, (1) pellets are formed from a mixture of (A) a metal oxide, (B) at least one of zinc oxide, lead oxide, and titanium oxide, and, if necessary, (C) a reductant, (D) a binder, and (E) water. After further adding (F) water depending on the need, (2) briquettes are molded by compressing the mixture that still contains the at least one of zinc oxide, lead oxide, and titanium oxide. If needed, (3) briquettes are dried. Subsequently, (4) a reduced metal can be obtained by charging the briquettes into a reducing furnace or, (5) when the briquettes fed contain zinc and/or lead, zinc and/or lead can be recovered from the briquettes by thermal reduction in a reducing furnace.

(A) Metal Oxide

Since the metal oxide includes an iron oxide, reduced iron can be produced by reducing the molded iron oxide briquettes in a reducing furnace. Steel-making dust can be used as the iron oxide. Dust that has solidified in gas after it is evaporated from the molten steel, electric furnace dust generated from an electric furnace, and other dust from various sources and of various forms can be used as the steel-making dust. An iron oxide derived from iron ore can also be mixed.

(B) At Least One of Zinc Oxide, Lead Oxide, and Titanium Oxide

When zinc oxide, lead oxide, or titanium oxide which is also used in paints or the like is incorporated in the metal oxide, it serves as a binding agent for the metal oxide and the strength of the molded briquettes improves without mixing a binder or water. Various advantages are achieved once the strength of the briquettes is enhanced. For example, in reducing the briquettes, powdering of the briquettes rarely occurs in the reducing step and thus the reduction ratio (reduced metal production ratio) of the metal oxide improves. When volatile metals such as zinc, lead, or the like incorporated in the briquettes are recovered, the recovery ratio and the purity also improve. Moreover, during pellet forming, the mixing and degassing of the material are accelerated, and thus an expensive mixer having a kneading function is not necessary for pelletizing the metal oxide.

For the reasons described above, at least one of zinc oxide, lead oxide, and titanium oxide is incorporated in the metal oxide in the present invention. The steel-making dust usually contains a metal such as zinc oxide derived from galvanized steel or the like although the metal content varies depending on the types of dust sources.

Adequately controlling the total content of the zinc oxide, lead oxide, and titanium oxide contributes to development of a further reliable binding effect. As for the specific control method, since the zinc oxide concentration varies depending on the type of dust sources as mentioned above, it is possible to adjust the total content of the zinc oxide, lead oxide, and titanium oxide by mixing adequate amounts of steel-making dust from different dust sources. The total content of zinc oxide, lead oxide, and titanium oxide is, for example, 10 percent by mass or more, preferably 15 percent by mass or more, and more preferably 20 percent by mass or more. While there is no specific limitation on the total content of zinc oxide, lead oxide, and titanium oxide, the total content is, for example, 60 percent by mass or less and more preferably 50 percent by mass or less when industrially practical ranges are considered.

(C) Reductant

When the molded briquettes are to be fed to a moving-type reducing furnace, e.g., a rotary hearth furnace, to reduce the metal oxide, a reductant necessary for reduction reaction is mixed into the pellets at the pellet forming stage. Examples of the reductant include carbon-containing substances such as coal, brown coal, anthracite coal, coke breeze, steel-making dust containing carbonaceous materials, plastics, and wood dust. From the viewpoint of retaining the strength of the briquettes, a reductant with a low volatile content is generally preferred; however, according to the method for producing the briquettes of the present invention, the briquettes have high strength and thus coal having a high volatile content can also be used.

The method of the present invention is also effective for the case in which an adjustor (lime, dolomite, or the like) required for the melting furnace other than the reductant is preliminarily mixed.

(D) Binder

An adequate amount of binder, such as starch or molasses, may be added as needed to improve the strength of the pellets.

(E) Water (Before and During Pelletization)

Adequate amounts of water may be added if necessary to improve the strength of the pellets. Before and during the pelletization, water can be relatively easily mixed homogeneously. Moreover, water has an effect of reducing the amount of binder used.

(F) Water (Before Briquetting)

In the present invention, at least one of zinc oxide, lead oxide, and titanium oxide serves as a binder as described above and, basically, there is no need to add water prior to briquetting. However, when a reductant is mixed in the pellets, water may be optionally added depending on the amount and type of the reductant, and this is naturally one of the embodiments that can be implemented.

Although drying of the briquettes is not an essential feature of the present invention, the strength of the briquettes can be further improved by drying. When the strength is higher, powdering caused by collapse after the briquetting step can be prevented and the adhesiveness at the surface can be suppressed by drying. Thus, large amounts of briquettes, which are intermediate products, can be stored in storages, such as bins and piles. The drying technique may be any, e.g., heat drying, air drying, or natural drying. However, when briquettes contain carbon, it is important that the temperature be lower than the spontaneous ignition temperature of carbon.

While the method for producing briquettes of the present invention is described above, the pellets are preferably dried before being molded into briquettes. This is because when the pellet surfaces are dry, the pellets rarely adhere to the interior of a briquetting machine when they are fed. Conceivable drying methods include forced drying and natural drying (e.g., for 4 hours and preferably one day or longer). Even when the pellet surfaces are dry, water inside the pellets disperses into all parts of the pellets during briquetting and contributes to improving the strength of the briquettes. The degree of drying is preferably 50% to 95% of the water content in the pellets before drying. The water content is 95% or less to effectively obtain an effect of preventing adhesion to the briquetting machine and the water content is more preferably 90% or less. The water content is 50% or more so that the briquettes maintain some degree of strength. The water content is more preferably 70% or more. The pellet water content used as an indicator for the degree of drying is determined not by measuring parts of the pellets, such as a pellet surface or a pellet interior, but by measuring the water content of the entire pellet.

The method for producing the briquettes of the present invention may further include a step of crushing an iron oxide raw material, such as iron ore or steel-making dust, or a carbonaceous substance with a crusher. After this crushing step, the method includes a step of forming primary granules by using the iron oxide raw material and the carbonaceous substance and a step of molding secondary granules by compressing the primary granules. First, crushing of the iron oxide raw material with a crusher is described. In the following description, the case in which steel-making dust raw material is used as an example of the iron oxide raw material is described as a representative example.

Crushing of the steel-making dust and/or the carbonaceous substance may be conducted with any crusher that has a function of finely crushing the grains of the raw materials. For example, crushers such as ball mills, roll crushers, hammer mills, and tube mills can be used. The subject to be crushed with the crusher may be any one of the steel-making dust and the carbonaceous substance.

It has been widely known that making the grains of the raw materials finer improves the strength of the agglomerates. However, when the grains of the raw material are fine, the amount of gas entering inside the raw material increases and thus the bulk density of the raw material tends to be low. The decrease in the bulk density of the raw material leads to a decrease in the apparent density of the molded product and eventually to a decrease in the strength of the molded product. To prevent this, in the past, an ultra high-pressure machine using a cold isostatic pressing technique had to be used. An ultra high-pressure machine that uses a cold isostatic pressing technique is a batch-type production facility and thus is not compatible to continuous operation and is not suitable for mass production due to limited production efficiencies. The present invention achieves higher-speed continuous operation by granulating the raw material, such as steel-making dust crushed by a crusher, in two steps.

Another possible reason for the improvement of the strength of the agglomerates by use of the crushed raw material (the reason other than the improvements in intermolecular force) is that the crushed fine grains are not spherical but have a shape with many irregularities that induce the anchoring effect (entangling effect) and increase the bonding between grains when a small amount of water or a binder is added.

2. Example of Facilities

Next, examples of the facilities related to the first embodiment of the present invention are described with reference to FIG. 2. The facilities below are merely examples and the method for producing briquettes of the present invention is not limited by the functions of the facilities below.

As shown in FIG. 2, a three-room storage 1 stores steel-making dust, a reductant, and a binder. The materials discharged from the storage 1 are mixed in a mixer 2 and charged into a pan pelletizer 3, which is a tumbling granulator. The pan pelletizer 3 is constituted by a rotating pan having a diameter of 2 to 6 m and a shape of a wok, as described in Patent Document 1. The pan is tilted by about 45 degrees, and water-containing steel-making dust and a reductant are tumbled in the pan so that the pellets grow as new powdery material coats the generated cores. Fully grown pellets leave the pan by their own weight.

The pelletized material is inserted into a briquetting machine 4. In the briquetting machine 4, the pellet material is compressed with two rollers having recesses and is solidified (briquetted) thereby, and discharged sequentially as the briquettes.

Note that the volume of the primary granules such as pellets is preferably $1/500$ or more of the inner volume of a form (normally called "segment pocket") for molding the briquettes. At a volume less than $1/500$, the contact area between the briquette and the segment-pocket inner wall becomes excessively large and the adhesion of the briquette to the segment-pocket inner wall increases. Although no particular upper limit is set for the briquette volume, the volume is equal to or less than the inner volume of the segment pocket from the practical viewpoint.

The pellets inserted into the briquetting machine 4 has the following two features.

(1) Still Containing at Least One of Zinc Oxide, Lead Oxide, and Titanium Oxide

Pellets still containing at least one of zinc oxide, lead oxide, and titanium oxide are inserted into the briquetting machine 4. Accordingly, the strength of the briquettes generated improves by the binding effect of the zinc oxide, lead oxide, or titanium oxide. Thus, the amount of the binder used can be reduced. The reduction of the amount of binder used contributes to preventing adhesion of the material onto the facility inner walls, such as an intermediate hopper or the like. Moreover, when a reductant such as a carbonaceous substance is blended into the metal oxide, the strength of the briquettes is likely to decrease. Thus, the method of the present invention which improves the strength by the effect of incorporating zinc oxide or the like is particularly useful.

(2) Pellets as are Formed

It is recommendable as one preferred embodiment of the present invention to insert the pellets as are formed (pelletized), into the briquetting machine 4 without classifying the pellets by their size. As described above, since the diameter of the pellets varies significantly, a pellet sieve is normally used to make the diameter uniform. However, in a pellet aggregate constituted by pellets having significantly varied diameters in the first embodiment, small pellets enter the gaps between large pellets and thus the bulk density is large with little empty spaces. When such pellet aggregates are compressed (briquetted), briquettes having a high bulk density and a high strength can be obtained. Moreover, a pellet sieve is not necessary and a facility to recycle unneeded pellets produced by classification is also not necessary.

The briquettes molded as such have water evaporated therefrom in a drier 5, charged into a rotary hearth furnace 6, and heated in a hearth to produce a reduced metal (reduced iron) by the action of the reductant (carbon). The rotary hearth furnace 6 is heated with a burner 7. Zinc or lead gasified by heating on the rotary hearth furnace 6 is recovered with a dust collector 8 (e.g., a machine equipped with a bag filter) and recycled as a zinc raw material or a lead raw material. The remaining gas is evacuated with an exhaust fan 9. A heat exchanger 10 is installed in the midway of the evacuation channel to effectively use the gas as the heat source for the hot air supplied to the drier 5 and the burner 7.

Second Embodiment (1) Crushing a Metal Oxide (Iron Oxide Raw Material)

The method for producing the briquettes of the present invention includes a step of crushing an iron oxide raw material, such as iron ore or steel-making dust, or a carbonaceous substance with a crusher. After this crushing step, the method includes a step of forming primary granules by using the iron oxide raw material and the carbonaceous substance and a step of molding secondary granules by compressing the primary granules. Therefore, crushing the iron oxide raw material with a crusher is first described below. In the following description, the case in which steel-making dust is used as an example of the iron oxide raw material is described as a representative example. Production of the primary and secondary granules is described later.

Crushing of the steel-making dust and/or the carbonaceous substance may be conducted with any crusher that has a function of finely crushing the grains of the raw materials. For example, crushers such as ball mills, roll crushers, hammer mills, and tube mills can be used. The subject to be crushed with the crusher may be any one of the steel-making dust and the carbonaceous substance.

It has been widely known that making the grains of the raw materials finer improves the strength of the agglomerates. However, when the grains of the raw material are fine, the amount of gas entering inside the raw material increases and thus the bulk density of the raw material tends to be low. The decrease in the bulk density of the raw material leads to a decrease in the apparent density of the molded product and eventually to a decrease in the strength of the molded product. To prevent this, in the past, an ultra high-pressure machine using a cold isostatic pressing technique had to be used. An ultra high-pressure machine that uses a cold isostatic pressing technique is a batch-type production facility and thus is not compatible to continuous operation and is not suitable for mass production due to limited production efficiencies. The present invention achieves higher-speed continuous operation by granulating the raw material, such as steel-making dust crushed by a crusher, in two steps.

Another possible reason for the improvement of the strength of the agglomerates by use of the crushed raw material (the reason other than the improvements in intermolecular force) is that the crushed fine grains are not spherical but have a shape with many irregularities that induce the anchoring effect (entangling effect) and increase the bonding between grains when a small amount of water or a binder is added.

(2) Incorporation of Zinc Oxide or the Like

On the assumption that the crushing of the raw material is conducted as above, a further improved method for producing briquettes of the present invention includes (2-1) a step of forming primary granules using a powdery raw material containing a volatile metal such as zinc oxide or lead oxide, and (2-2) a step of compressing the primary granules still containing the volatile metal to mold secondary granules.

Figure 4:
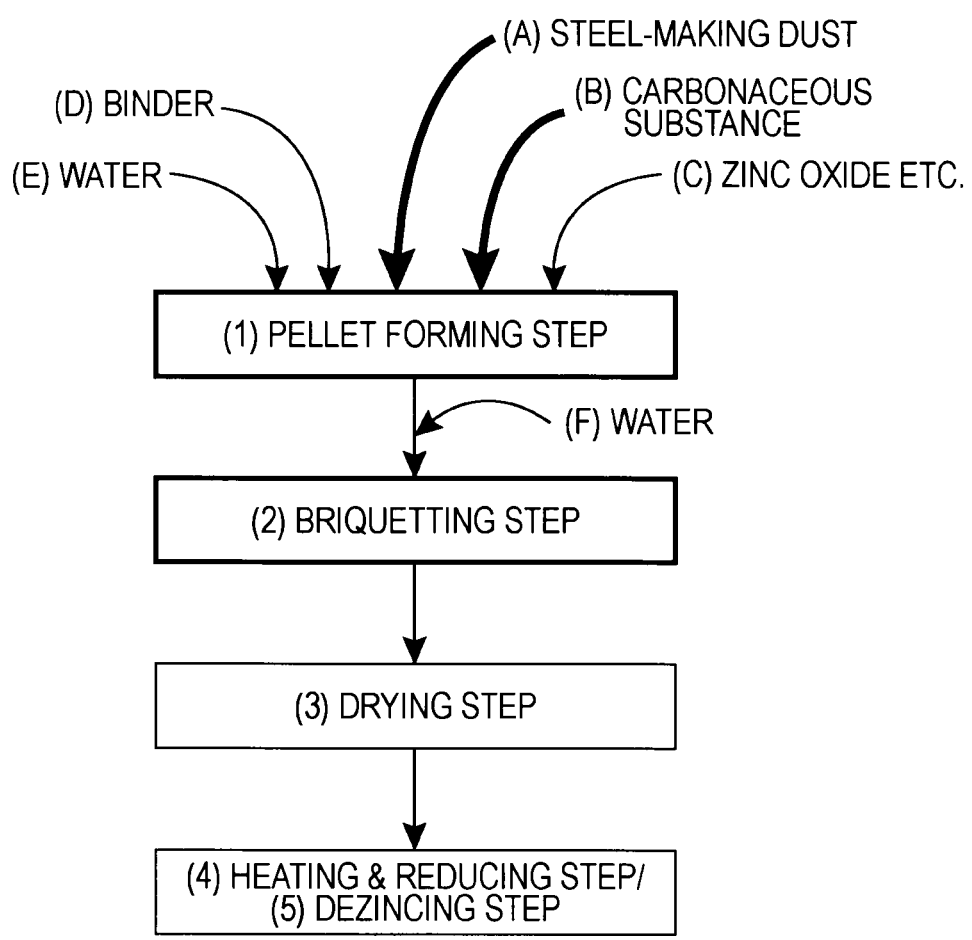
FIG. 4 is a process diagram related to a second embodiment of the present invention.

Examples of the method for forming the primary granules include tumbling granulation, kneading granulation, and pressure compaction. Here, the primary granules formed by tumbling granulation may be referred to as "pellets" and the secondary granules formed by pressure compaction may be referred to as "briquettes". A second embodiment of the present invention will now be described by focusing on (2-1) the step of forming pellets and (2-2) the step of briquetting. FIG. 4 is a process diagram related to the second embodiment of the present invention. FIG. 2 is a diagram showing one example of facilities for implementing the process.

(Granulating Process)

As shown in FIG. 4, (2-1) pellets are made from a mixed raw material obtained by mixing (A) steel-making dust, (B) a carbonaceous substance, and, if needed (C) an oxide containing a volatile metal (e.g., zinc, lead, sodium, or potassium) or a complex or complex salt thereof, (D) a binder, and (E) water.

After further adding (F) water depending on the need, (2-2) briquettes are molded by compressing the mixture still containing the volatile metal. If needed, (2-3) briquettes are dried. Subsequently, (2-4) reduced iron can be obtained by feeding the briquettes into a reducing furnace or, (2-5) when the briquettes fed contain zinc and/or lead, zinc and/or lead can be recovered from the briquettes by thermal reduction in a reducing furnace.

(A) Steel-Making Dust

Since steel-making dust includes iron oxides, reduced iron can be produced by reducing the molded briquettes of the iron oxides in a reducing furnace. Dust that has solidified in gas after it is evaporated from blast furnaces, melting furnaces, electric furnaces, and the like, and other dust from various sources and of various forms can be used as the steel-making dust.

(B) Carbonaceous Substance

When the molded briquettes are to be charged into a moving-type reducing furnace, e.g., a rotary hearth furnace, to reduce the iron oxides, a reductant necessary for reduction reaction is mixed into the pellets at the pellet forming stage. Examples of the reductant include carbon-containing substances such as coal, brown coal, anthracite coal, coke breeze, steel-making dust containing carbonaceous materials, plastics, and wood dust. From the viewpoint of retaining the strength of the briquettes, a reductant with a low volatile content is generally preferred; however, according to the method for producing the briquettes of the present invention, the briquettes have high strength and thus coal having high volatile content can also be used.

The method of the present invention is also effective for the case in which an adjustor (lime, dolomite, or the like) required for the melting furnace other than the reductant is preliminarily mixed.

(C) Oxide Containing a Volatile Metal (Zinc Oxide or the Like)

The present invention involves crushing the steel-making dust and/or the carbonaceous substance as described above to improve the strength of the briquettes. In order to further improve the strength of the briquettes, a volatile metal having a melting point of 2000° C. or less (preferably 1500° C. or less) may be added to the mixed raw material. When a volatile metal-containing oxide such as zinc oxide or lead oxide used as a pigment for paints or the like is incorporated in the raw material, the oxide serves as a binding agent for the steel-making dust or the like and the strength of the molded briquettes improves without mixing a binder or water. Various advantages are achieved once the strength of the briquettes is enhanced. For example, in reducing the briquettes, powdering of the briquettes rarely occurs in the reducing step and thus the reduction ratio (reduced iron production ratio) of the iron oxide improves. When volatile metals such as zinc, lead, or the like incorporated in the briquettes are recovered, the recovery ratio and the purity also improve. Moreover, during pellet forming, the mixing and degassing of the material are accelerated, and thus an expensive mixer having a kneading function is not necessary for pelletizing the mixed raw material.

In the present invention, the mixed material preferably contains a volatile metal for the above-described reasons. The steel-making dust usually contains a metal oxide such as zinc oxide derived from galvanized steel or the like although the metal oxide content varies depending on the types of dust sources.

Adequately controlling the total content of the oxide containing a volatile metal contributes to achieving a further reliable binding effect. As for the specific control method, since the zinc oxide concentration varies depending on the type of dust sources as mentioned above, it is possible to adjust the total content of a volatile metal-containing oxide such as zinc oxide or lead oxide, by mixing adequate amounts of steel-making dust from different dust sources. The total content of the volatile metal-containing oxide is, for example, 10 percent by mass or more, preferably 15 percent by mass or more, and more preferably 20 percent by mass or more. While there is no specific limitation on the total content of the volatile metal-containing oxide, the total content is, for example, 60 percent by mass or less and more preferably 50 percent by mass or less when industrially practical ranges are considered.

(D) Binder

An adequate amount of binder, such as starch or molasses, may be added as needed to improve the strength of the pellets.

(E) Water (Before and During Pelletization)

Adequate amounts of water may be added if necessary to improve the strength of the pellets. Before and during the pelletization, water can be relatively easily mixed homogeneously. Water also has an effect of reducing the amount of binder used.

(F) Water (Before Briquetting)

In this invention, since the raw material grains such as steel-making dust are crushed, the intermolecular force between the grains are strengthened and basically there is no need to add water before briquetting. However, water may be optionally added depending on the amount and type of the carbonaceous substance used in the mixture, and this is naturally one of the embodiments that can be implemented.

Although drying of the briquettes is not an essential feature of the present invention, the strength of the briquettes can be further improved by drying. When the strength is higher, powdering caused by collapse after the briquetting step can be prevented and the adhesiveness at the surface can be suppressed by drying. Thus, large amounts of briquettes, which are intermediate products, can be stored in storages, such as bins and piles. The drying technique may be any, e.g., heat drying, air drying, or natural drying. However, when briquettes contain carbon, it is important that the temperature be lower than the spontaneous ignition temperature of carbon.

While the method for producing briquettes of the present invention is described above, the pellets are preferably dried before being molded into briquettes. This is because when the pellet surfaces are dry, the pellets rarely adhere to the interior of a briquetting machine when they are fed. Conceivable drying methods include forced drying and natural drying (e.g., for 4 hours and preferably one day or longer). Even when the pellet surfaces are dry, water inside the pellets disperses into all parts of the pellets during briquetting and contributes to improving the strength of the briquettes. The degree of drying is preferably 50% to 95% of the water content in the pellets before drying. The water content is 95% or less to effectively obtain an effect of preventing adhesion to the briquetting machine and the water content is more preferably 90% or less. The water content is 50% or more so that the briquettes maintain some degree of strength. The water content is more preferably 60% or more. The pellet water content used as an indicator for the degree of drying is determined not by measuring parts of the pellets, such as a pellet surface or a pellet interior, but by measuring the water content of the entire pellet.

EXAMPLES

The present invention will now be described more specifically by using examples. The present invention is not limited by Examples described below. Various modifications and alterations are possible within the scope described above and below and are all included in the technical scope of the present invention.

Example 1

Figure 3:
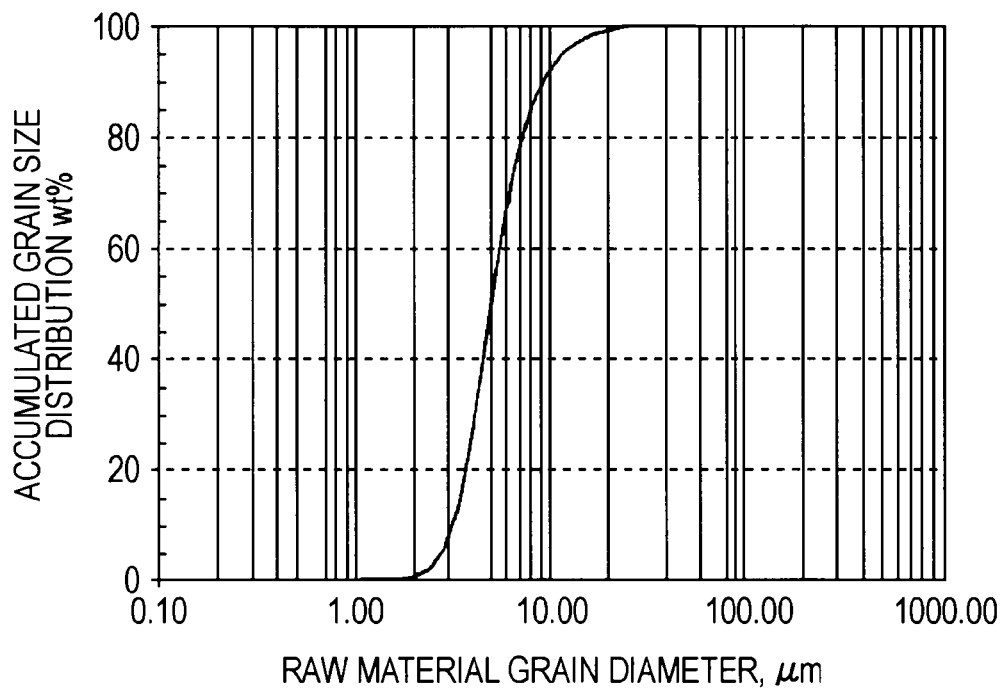
FIG. 3 is a graph showing the grain size distribution of electric furnace dust used in Examples of the present invention.
Figure 3:
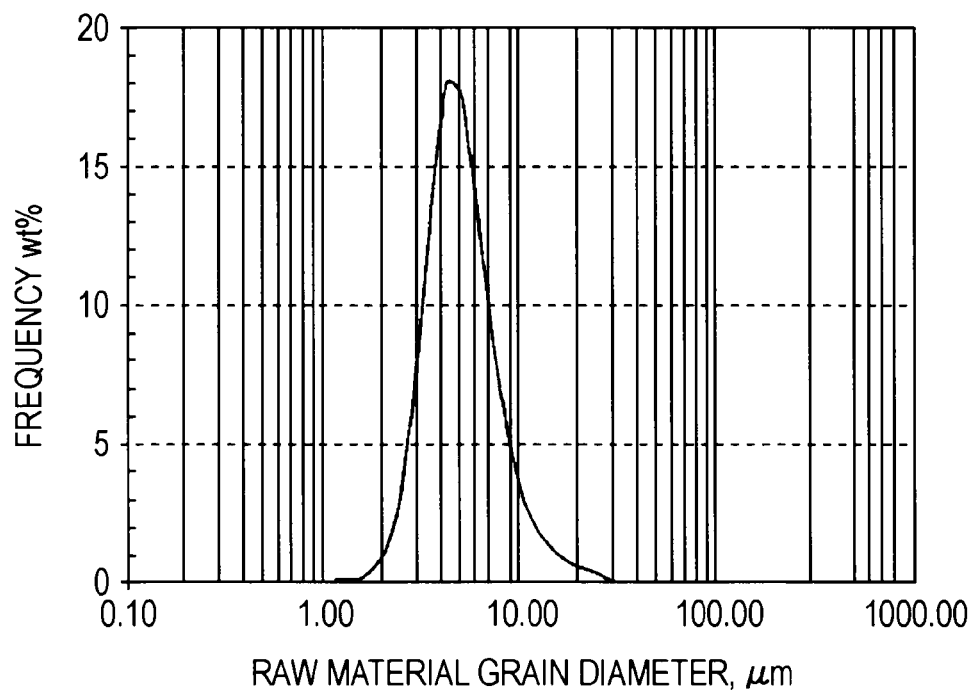

An electric furnace dust raw material (also referred to as "dust raw material" hereinafter) having a total iron content of 22.7 percent by mass (hereinafter also simply noted as "%"), a zinc oxide content of 38.4 percent by mass, a lead oxide content of 2.1 percent by mass, and a titanium oxide content of 0.1 percent by mass was used as the steel-making dust raw material. The grain size distribution of the dust raw material is shown in FIG. 3. The peak granule diameter was about 4.3 µm. The bulk density of the electric furnace dust raw material was 0.76 g/cm$^3$. Coke breeze (86% fixed carbon) was blended as the reductant. The amount of dust raw material blended was 85.7% and the amount of the coke breeze blended was 14.3%.

In the step of mixing the raw materials before the pelletizing step, the materials were mixed for 5 minutes in a double-shaft ribbon blender (produced by Chemical Engineering Corporation), 4% water and 2% binder (molasses) were added thereto, and the resulting mixture was mixed for another 5 minutes. The size of the container of the blender was 45 cm in width, 36 cm in length, and 35 cm in height. The speed of rotation was 77 rpm.

In the pelletizing step, while the mixed raw material was being fed to a pan pelletizer (produced by Maya Tokushu Kogyo Kabushiki Kaisha) having a diameter of 900 mm, a rim height of 160 mm, a tilt angle of 47 degrees, and a rotating rate of 17 rpm, water was added to make pellets. As for the pellet size, pellets having a diameter in the range of 3.0 to 6.0 mm accounted for 15.2% and pellets having a diameter of 6.0 to 9.5 mm accounted for 84.8%. The bulk density of the pellets was 1.39 g/cm$^3$ (for reference, apparent density was 2.44 g/cm$^3$), which was larger than 0.76 g/cm$^3$, i.e., the bulk density of the raw material before pelletization. The water content of the pellets was 10.8 percent by mass. The zinc oxide content in the pellets was 32.9 percent by mass, the lead oxide content was 1.8 percent by mass, and the titanium oxide content was 0.09 percent by mass.

The pellets produced as above were directly fed to a briquetting machine (produced by Sintokogio Ltd., molding pressure: 160 kg/cm$^2$ (linear pressure: about 4 t/cm), roller rotating rate: 2.5 rpm) without any dezincing process unlike Patent Document 2 and without classifying the pellets, and the pellets were compressed to form briquettes.

The apparent density of the briquettes obtained as such was 2.61 g/cm$^3$. While the strength of the briquettes must be high enough not to cause powdering during transportation of briquettes in a stored state, the briquettes showed a sufficient strength, namely, a shatter strength of 22 (the number of times the briquettes were dropped repeatedly from a height of 45 cm until the briquettes were shattered). The crushing strength was 49 kN/P.

When the briquettes were dried at 105° C. for a whole day and night, the strength increased further and the shatter strength increased to 30. Since a shatter strength of 30 is sufficient for transportation, storage, etc., of the briquettes, the shattering test exceeding this number of times was not conducted.

The crushing strength of the briquettes after drying significantly improved to 765 kN/P. This confirms that the strength of the briquettes improves even when the amount of binder used is the same (2%) as in Comparative Examples 1 to 4 described below.

Example 2

Pellets were produced as in Example 1 to obtain briquettes from pellets. The difference from Example 1 was that whereas 4% water and 2% binder (molasses) were mixed in the raw material mixing step before the pelletizing step in Example 1, no binder was used and 6% water was mixed in Example 2.

As for the size of pellets produced, pellets having a diameter in the range of 3.0 to 6.0 mm accounted for 23.0% and pellets having a diameter of 6.0 to 9.5 mm accounted for 77.0%. In Example 2, presumably because no binder was used, the bulk density of the pellets was 1.36 $g/cm^3$ (for reference, the apparent density was 2.48 $g/cm^3$), which was slightly lower than the value in Example 1 (1.39 $g/cm^3$). Still this was a sufficient increase since the bulk density of the dust raw material before pelletizing was 0.76 $g/cm^3$. The water content in the pellets was 11.0%, which was slightly higher than in Example 1.

The apparent density of the briquettes produced in Example 2 was 2.65 $g/cm^3$. While the strength of the briquettes needs to be high enough not to easily cause powdering even when the briquettes are transported in a stored state as described above, the briquettes showed a sufficient strength, namely, a shatter strength of 20. The crushing strength was 98 kN/P.

When the briquettes were dried at 105° C. for a whole day and night, the strength increased further and the shatter strength increased to 30. Since a shatter strength of 30 is sufficient for transportation, storage, etc., of the briquettes, the shattering test exceeding this number of times was not conducted.

The crushing strength of the briquettes after drying significantly improved to 729 kN/P as in Example 1. This confirmed that the briquette strength could be improved without using any binder.

In Examples 1 and 2, a raw material having a size distribution shown in FIG. 3 was used. It was also found that the same effect was obtained from a raw material in which about 5 percent by mass of zinc oxide was mixed into iron ore having an average granule diameter of about 100 μm. Moreover, although the results of the pellets having diameter of 3.0 to 9.5 mm are shown, the same effect was obtained with pellets having a volume smaller than that of the segment pocket of a pressure compaction machine since pellets were adequately housed in the segment pocket.

Although a method in which a reductant was added during pellet forming was described, the method is not limited to this. A reductant, a binder, or both the reductant and the binder may be mixed after formation of the pellets and then the resulting mixture may be pressure-compacted.

Although the briquettes were dried by heating in Examples 1 and 2, the method for drying is not limited. Air drying (forced drying) or natural drying may be conducted. By decreasing the water content after drying to 6% or less or by decreasing the water content to half or less of the water content before drying, an improvement in strength was observed.

Example 3

Pellets were produced as in Example 2 to obtain briquettes from pellets. The difference from Example 2 was that the type of steel-making dust used as the raw material was changed in a variety of ways.

Table 1 shows the results of the same experiments as in Example 2 on thirteen different types of dust raw materials.

TABLE 1

Experiments of Example 3 (briquettes were formed from pellets)

| | | Dust raw material No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Dust bulk density | $g/cm^3$ | 1.01 | 0.82 | 0.98 | 0.67 | 1.03 | 1.17 | 0.75 | 1.03 | 0.79 | 0.83 | 1.04 | — | — |
| Iron oxide | mass % | 19.01 | 22.9 | 27.0 | 14.9 | 26.8 | 19.4 | 19.1 | 23.2 | 23.9 | 24.6 | 15.7 | 38.9 | 42.8 |
| (a) Zinc oxide | mass % | 26.7 | 23.4 | 14.8 | 19.9 | 15.1 | 18.2 | 17.4 | 24.3 | 24.7 | 20.6 | 34.9 | 9.4 | 4.7 |
| (b) Lead oxide | mass % | 0.2 | 0.3 | 1.5 | 1.0 | 0.6 | 0.8 | 1.4 | 0.2 | 1.8 | 1.8 | 0.2 | 0.7 | 0.4 |
| (c) Titanium oxide | mass % | 0.1 | 0.1 | 0.1 | 0.1 | 0.1 | 0.1 | 0.1 | 0.1 | 0.1 | 0.1 | 0.1 | 0.0 | 0.0 |
| (a) + (b) + (c) | mass % | 27.0 | 23.8 | 16.4 | 20.9 | 15.8 | 19.1 | 18.8 | 24.6 | 26.5 | 22.4 | 35.2 | 10.1 | 5.1 |

| | | Agglomerates | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Apparent density before drying | $g/cm^3$ | 2.91 | 2.96 | 2.82 | 2.89 | 2.98 | 2.96 | 2.79 | 3.00 | 3.12 | 3.04 | 3.08 | 2.61 | 2.53 |
| Shatter strength before drying | Number of times | 30 | 30 | 9 | 30 | 29 | 30 | 30 | 30 | 30 | 24 | 30 | 3 | 1 |
| Shatter strength after drying | Number of times | 30 | 30 | 30 | 30 | 30 | 30 | 30 | 30 | 30 | 30 | 30 | 10 | 6 |

As shown in Table 1, regardless of the type of the dust raw material, when a metal oxide powder containing at least one of zinc oxide, lead oxide, and titanium oxide was used, the briquettes produced without using any binder and dried showed a shatter strength of 6 or more, which was more than 3 required for problem-free transportation.

In addition, incorporation of 10 percent by mass or more of zinc oxide, lead oxide, and titanium oxide increases the strength of the dried briquettes to a shatter strength of 10 or more; moreover, even the briquettes before drying showed a shatter strength of 3 or more, which was required for problem-free transportation.

Example 4

Some pellets formed in Example 2 were saved and naturally dried for 7 days, and the resulting pellets were used to obtain briquettes. The water content of the pellets was measured prior to briquetting and was 6.7 percent by mass. The apparent density of the briquettes obtained was 2.83 g/cm³. The average shatter strength of the briquettes was 8, which is a strength required for problem-free transportation. The crushing strength was 303 kN/P.

When the briquettes were dried at 105° C. for a whole day and night, the strength increased further and the shatter strength increased to 30. As in Examples 1 to 3, since a shatter strength of 30 is sufficient for transportation, storage, etc., of the briquettes, the shattering test exceeding this number of times was not conducted. The crushing strength of the briquettes after drying significantly improved to 1416 kN/P.

After molding of the briquettes, the interior of the briquetting machine was checked but substantially no adhesion of the material on the interior of the machine was observed (in Example 2, very little adhesion occurred).

Example 5

Pellets were produced under the same conditions as in Example 2 and briquettes were prepared from the pellets. The reductant used was different from that used in Example 2. Coal having a volatile content of 28.0 percent by mass (fixed carbon: 61.6 percent by mass) was used as the reductant. The amount of the dust raw material blended was 80.9 percent by mass, and the amount of the coal blended was 19.1 percent by mass.

As for the pellet size, pellets having a diameter in the range of 3.0 to 6.0 mm accounted for 21.4% and pellets having a diameter of 6.0 to 9.5 mm accounted for 78.6%. The bulk density of the pellets increased to 1.29 g/cm³. The water content in the pellets was 12.7 percent by mass. The briquettes obtained therefrom had an apparent density of 2.33 g/cm³. The average shatter strength of the briquettes was 14, which is a strength that does not cause any problem for transportation. The crushing strength was 122 kN/P.

When the briquettes were dried at 105° C. for a whole day and night, the strength increased further and the average shatter strength increased to 19. The crushing strength of the briquettes after drying significantly improved to 1,031 kN/P. Thus, it was found that the strength of the briquettes sufficiently improves even when coal having a high volatile content is used.

Example 6

Pellets were produced under the same conditions as in Example 2 and briquettes were prepared from the pellets. The reductant used was different from that used in Example 2. Coal having a volatile content of 43.6 percent by mass (fixed carbon: 51.9 percent by mass) was used as the reductant. The amount of the dust raw material blended was 78.1 percent by mass, and the amount of the coal blended was 21.9 percent by mass.

As for the pellet size, pellets having a diameter in the range of 3.0 to 6.0 mm accounted for 31.6% and pellets having a diameter of 6.0 to 9.5 mm accounted for 68.4%. The bulk density of the pellets increased to 1.28 g/cm³. The water content in the pellets was 12.1 percent by mass. The briquettes obtained therefrom had an apparent density of 2.17 g/cm³. The average shatter strength of the briquettes was 4, which is a strength that does not cause any problem for transportation. The crushing strength was 113 kN/P.

When the briquettes were dried at 105° C. for a whole day and night, the strength increased further and the average shatter strength increased to 15. The crushing strength of the briquettes after drying significantly improved to 575 kN/P. Thus, it was found on the basis of this example that the strength of the briquettes is sufficiently improved even when coal having a high volatile content is used.

Example 7

In Examples 1 to 6, experiments in which the dust raw material was first pelletized and then briquetted are described. In this reference example, briquetting was conducted instead of pelletizing. In other words, the pressure compaction was conducted twice to directly mold a mixture of a dust raw material, a reductant, and a binder into briquettes. As a result, the average apparent density of the briquettes was 2.3 g/cm³, and the shatter strength was 30 both before and after drying of the briquettes. In this example, 12 percent by mass of molasses was added as the binder.

Comparative Example 1

An experiment of molding briquettes using 13 types of dust raw materials shown in Example 3 was conducted. However, in the experiment of Comparative Example 1, no pellets were formed from the dust raw material and briquettes were directly molded from the dust raw material. The same conditions as in Example 3 were applied except that the pelletizing step was omitted. As a result, for all dust raw materials, although a sort of briquette shape was obtained by molding, the resulting products were extremely brittle and could not even be subjected to physical property experiment such as shatter strength and the like as shown in Table 2.

TABLE 2

Experiments of Comparative Example 1 (pellets were not used to form briquettes)

| | | Dust raw material No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Dust bulk density | g/cm³ | 1.01 | 0.82 | 0.98 | 0.67 | 1.03 | 1.17 | 0.75 | 1.03 | 0.79 | 0.83 | 1.04 | — | — |
| Iron oxide | mass % | 19.0 | 22.9 | 27.0 | 14.9 | 26.8 | 19.4 | 19.1 | 23.2 | 23.9 | 24.6 | 15.7 | 38.9 | 42.8 |
| (a) Zinc oxide | mass % | 26.7 | 23.4 | 14.8 | 19.9 | 15.1 | 18.2 | 17.4 | 24.3 | 24.7 | 20.6 | 34.9 | 9.4 | 4.7 |
| (b) Lead oxide | mass % | 0.2 | 0.3 | 1.5 | 1.0 | 0.6 | 0.8 | 1.4 | 0.2 | 1.8 | 1.8 | 0.2 | 0.7 | 0.4 |
| (c) Titanium oxide | mass % | 0.1 | 0.1 | 0.1 | 0.1 | 0.1 | 0.1 | 0.1 | 0.1 | 0.1 | 0.1 | 0.1 | 0.0 | 0.0 |
| (a) + (b) + (c) | mass % | 27.0 | 23.8 | 16.4 | 20.9 | 15.8 | 19.1 | 18.8 | 24.6 | 26.5 | 22.4 | 35.2 | 10.1 | 5.1 |

TABLE 2-continued

Experiments of Comparative Example 1 (pellets were not used to form briquettes)

| | | Agglomerates | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Apparent density before drying | g/cm³ | Immeasurable due to insufficient strength | | | | | | | | | | | | |
| Shatter strength before drying | Number of times | | | | | | | | | | | | | |
| Shatter strength after drying | Number of times | | | | | | | | | | | | | |

Comparative Example 2

The same experiment as in Comparative Example 1 was conducted in Comparative Example 2. That is, no pellets were formed from the dust raw material and briquettes were directly molded from the dust raw material. The difference from Comparative Example 1 was that, as in Example 1, 2% of binder (molasses) was used. In Comparative Example 2, the bulk density of the dust raw material mixed with the reductant and the binder slightly increased to 0.80 g/cm³. When this mixture was fed to a briquetting machine (under the same conditions as in Examples 1 to 6 and Comparative Example 1) equipped with a screw feeder, although the briquettes were molded, they were extremely brittle and could not even be subjected to physical property experiment such as shatter strength and the like.

Comparative Example 3

In Comparative Example 3, an experiment was conducted at the same blending ratio as in Comparative Example 2. The differences from Comparative Examples 2 were as follows. It was thought that, in Comparative Example 2, the mixing of the raw material dust, the reductant, the binder, and the like was possibly insufficient. Thus, the mixing time after 4% of water and 2% of binder (molasses) were added was extended to 30 minutes. The bulk density of the raw material after mixing was 0.81 g/cm³ which was slightly higher than in Comparative Example 2. This mixture was fed to a briquetting machine (under the same conditions as in Examples 1 to 6 and Comparative Examples 1 and 2) equipped with a screw feeder without forming pellets as in Comparative Example 2. The results were the same as Comparative Example 2, that is, although the briquettes were formed they were extremely brittle and could not even be subjected to physical property experiment such as shatter strength and the like. Thus, extending the mixing time did not result in a significant increase in strength.

Comparative Example 4

In Comparative Example 4, an experiment was conducted at the same blending ratio as in Comparative Example 2. However, the double-shaft ribbon blender (the mixer used in Examples 1 to 3 and Comparative Examples 1 to 3) was changed and a mix muller mixer having a higher kneading performance (container size: 254 mm diameter×73 mm width, compression load: 181 to 275 N, spring-load type, rotating speed: 44 rpm) was used instead. The procedure of blending and mixing the raw material dust is the same as in Comparative Example 2.

That is, 85.7% fine powder dust raw material and 14.3% coke breeze were mixed for 5 minutes in a double-shaft ribbon blender, and 4% of water and 2% of binder (molasses) were added thereto. The resulting mixture was mixed for 5 minutes. After mixing, the bulk density of the dust raw material increased slightly to 1.01 g/cm³. This mixture was mixed for another 15 minutes in a mix muller mixer. Then the mixture was fed to a briquetting machine (under the same conditions as in Example 1) equipped with a screw feeder without forming pellets. The results were the same as Comparative Examples 2 and 3, that is, although the briquettes were formed they were extremely brittle and could not even be subjected to physical property experiment such as shatter strength. Thus, use of a mix muller mixer with high kneading performance did not result in a significant increase in strength.

| Reference Numerals |
|---|
| 1: storage |
| 2: mixer |
| 3: pan pelletizer |
| 4: briquetting machine |
| 5: drier |
| 6: rotary hearth furnace |
| 7: burner |
| 8: dust collector |
| 9: exhaust fan |
| 10: heat exchanger |

The invention claimed is:

1. A method for producing a briquette, the method comprising:
   forming a primary granule by compressing a powder,
   compressing the primary granule so as to mold the primary granule into a secondary granule, and
   drying the secondary granule,
   wherein the powder comprises a metal oxide and
   the metal oxide comprises an iron oxide and at least one oxide selected from the group consisting of zinc oxide, lead oxide, and titanium oxide.

2. The method of claim 1, wherein forming the primary granule comprises forming by tumbling granulation, kneading granulation, or pressure compaction.

3. The method of claim 1, wherein a total content of the at least one oxide selected from the group consisting of zinc oxide, lead oxide, and titanium oxide is 10 percent by mass or more.

4. The method of claim 1, further comprising:
   crushing the metal oxide, crushing a reductant, or crushing both the metal oxide and a reductant, to form the powder before forming the primary granule.

5. The method of claim 4, further comprising:
mixing the metal oxide and a reductant, thereby preparing a mixed raw material, between the crushing and the forming.

6. The method of claim 4, wherein the powder comprises a steel-making dust.

7. The method of claim 4,
wherein the metal oxide further comprises at least one metal selected from the group consisting of zinc, lead, sodium, and potassium, and
the secondary granule is molded while comprising the metal.

8. The method of claim 7, wherein the powder comprises a total of 10 percent by mass or more of an oxide, a chloride, or a sulfide of at least one metal selected from the group consisting of zinc, lead, sodium, and potassium.

9. The method of claim 4,
wherein the metal oxide comprises an oxide of a volatile metal having a melting point of 2000° C. or less and
compressing the primary granule to mold the primary granule into a secondary granule comprises molding while the secondary granule comprises the oxide of the volatile metal.

10. The method of claim 1, further comprising:
adding a reductant and water to the primary granule.

11. The method of claim 10, further comprising:
drying the primary granule prior to molding it into the secondary granule.

12. The method of claim 11, wherein the drying the primary granule comprises reducing a water content in the primary granule to 50 to 95 percent by mass relative to a water content before drying.

13. The method of claim 1,
wherein compressing the primary granule so as to mold the primary granule into a secondary granule comprises molding with a form, and
a volume of the primary granule is 1/500 or more of an inner volume of the form.

14. A method for producing a reduced metal, comprising:
reducing a briquette obtained by a process comprising the method of claim 1.

15. The method of claim 14, wherein the reducing comprises reducing with a rotary hearth furnace, a kiln furnace, or an electric heat reducing melting furnace.

16. A method for separating zinc, comprising:
evaporating zinc by heating and reducing a briquette comprising zinc oxide obtained by a process comprising the method of claim 1.

17. A method for separating lead, comprising:
evaporating lead by heating or heating and reducing a briquette comprising lead oxide obtained by a process comprising the method of claim 1.

18. A method for producing a briquette with a reductant and a metal oxide, the method comprising:
crushing the reductant, the metal oxide, or both, forming a primary granule comprising the metal oxide and the reductant,
compressing the primary granule to mold the primary granule into a secondary granule, and
drying the secondary granule,
wherein the metal oxide comprises an iron oxide raw material.

19. The method of claim 18, wherein forming the primary granule comprises tumbling granulation, kneading granulation, or pressure compaction.

20. The method of claim 18, further comprising:
preparing a mixed raw material by mixing the metal oxide and the reductant between the crushing and the forming.

21. The method of claim 18, wherein the metal oxide comprises steel-making dust.

22. The method of claim 18,
wherein the metal oxide further comprises at least one metal selected from the group consisting of zinc, lead, sodium, and potassium, and
the secondary granule is molded while comprising the metal.

23. The method of claim 22, wherein the powder comprises a total of 10 percent by mass or more of an oxide, a chloride, or a sulfide of at least one metal selected from the group consisting of zinc, lead, sodium, and potassium.

24. The method for of claim 18,
wherein the metal oxide comprises an oxide of a volatile metal having a melting point of 2000° C. or less and
compressing the primary granule to mold the primary granule into a secondary granule comprises molding while the secondary granule comprises the oxide of the volatile metal.

25. The method of claim 18, further comprising:
adding water to the primary granule.

26. The method of claim 25, further comprising:
drying the primary granule prior to molding it into the secondary granule.

27. The method of claim 26, wherein the drying the primary granule comprises reducing a water content in the primary granule to from 50 to 95 percent by mass relative to a water content before drying.

28. The method of claim 18,
wherein compressing the primary granule so as to mold the primary granule into a secondary granule comprises molding with a form, and
a volume of the primary granule is 1/500 or more of an inner volume of the form.

29. A method for producing a reduced metal, comprising:
reducing a briquette obtained by a process comprising the method of claim 18.

30. The method of claim 29, wherein the reducing comprises reducing with a rotary hearth furnace, a kiln furnace, or an electric heat reducing melting furnace.

31. A method for separating zinc, comprising:
evaporating zinc by heating and reducing a briquette comprising zinc oxide obtained by a process comprising the method of claim 18.

32. A method for separating lead, comprising:
evaporating lead by heating or heating and reducing a briquette comprising lead oxide obtained by a process comprising the method of claim 18.

* * * * *